March 18, 1952 W. B. DEAN ET AL 2,589,997
RAILWAY CAR
Filed March 15, 1947 11 Sheets-Sheet 1
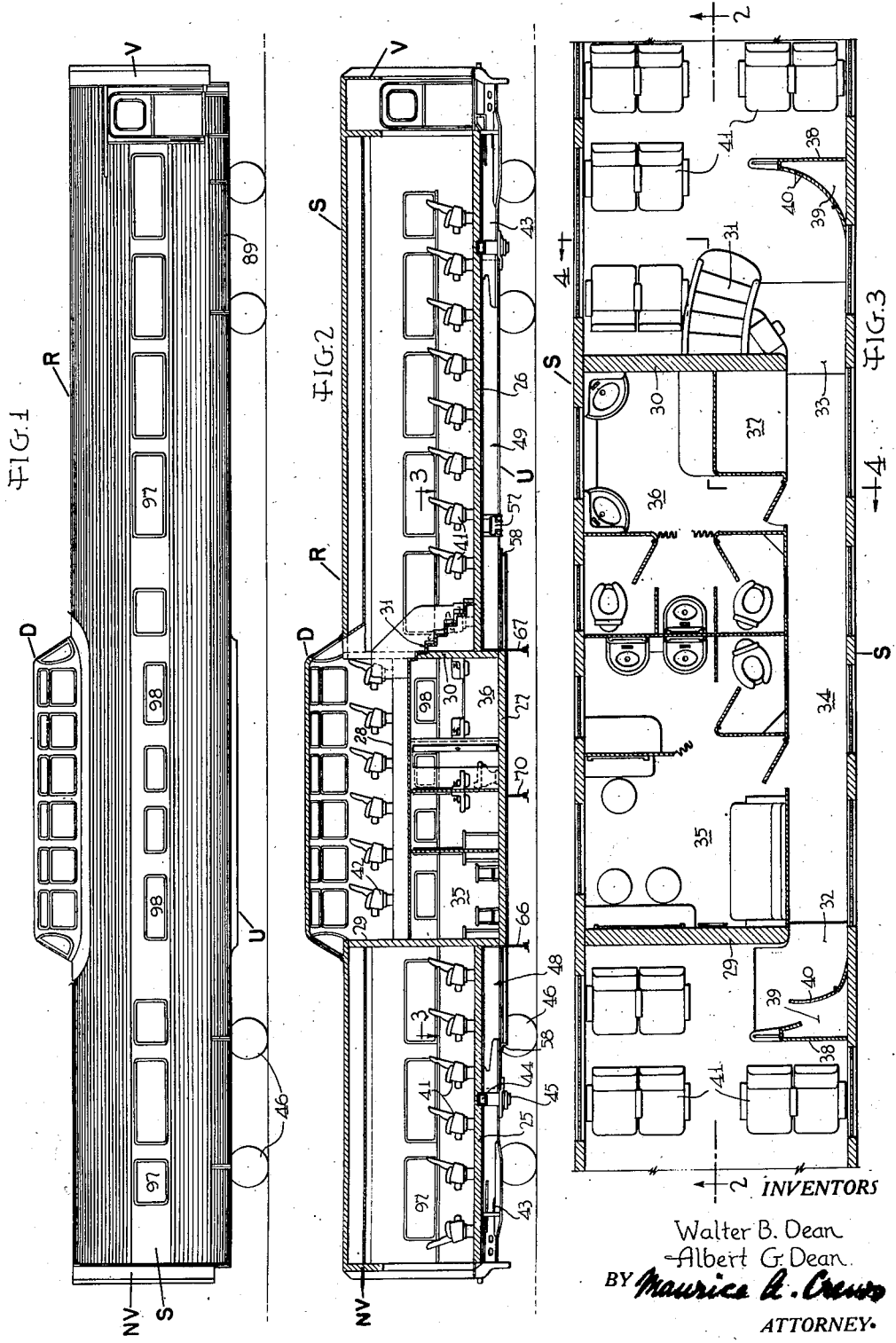
INVENTORS
Walter B. Dean
Albert G. Dean
BY *Maurice A. Cressy*
ATTORNEY.

March 18, 1952 — W. B. DEAN ET AL — 2,589,997
RAILWAY CAR
Filed March 15, 1947 — 11 Sheets-Sheet 2

INVENTORS
Walter B. Dean
Albert G. Dean
BY Maurice A. Crews
ATTORNEY

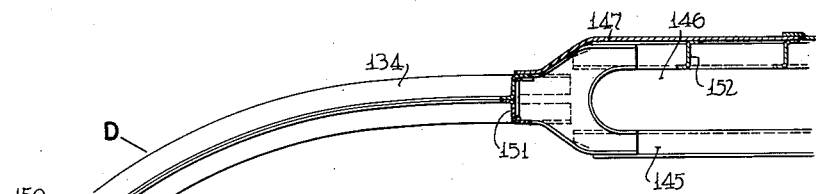
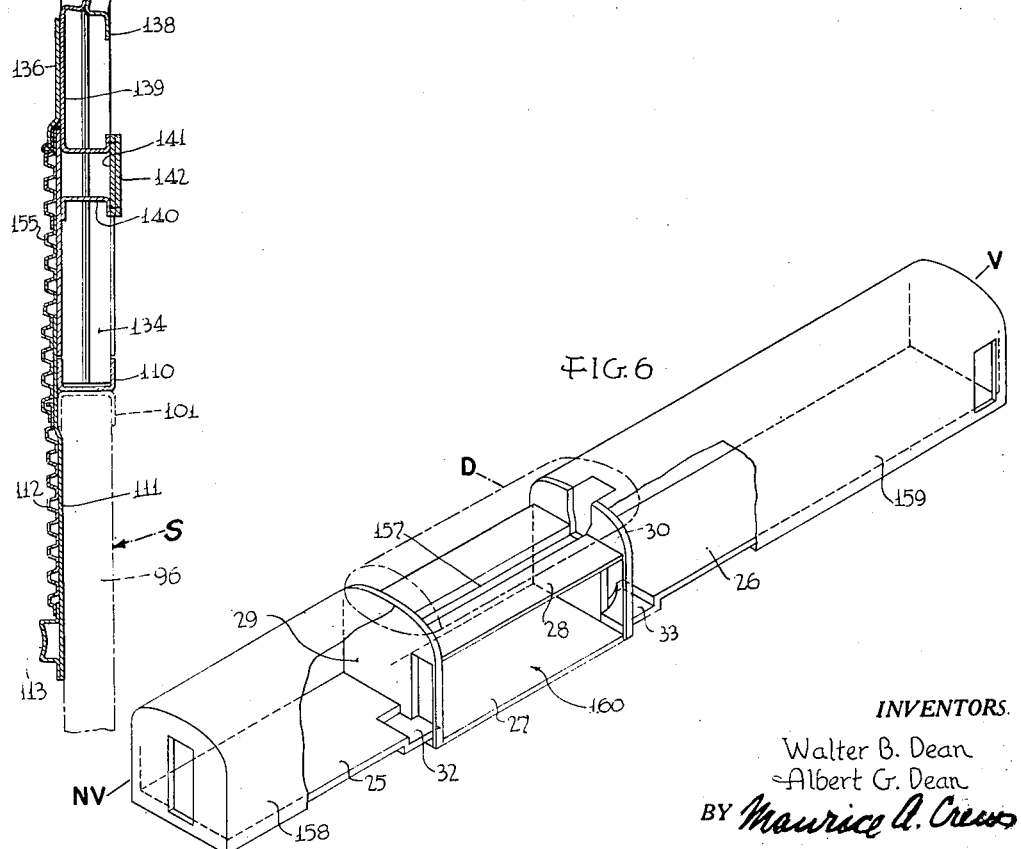

March 18, 1952
W. B. DEAN ET AL
2,589,997
RAILWAY CAR
Filed March 15, 1947
11 Sheets-Sheet 4
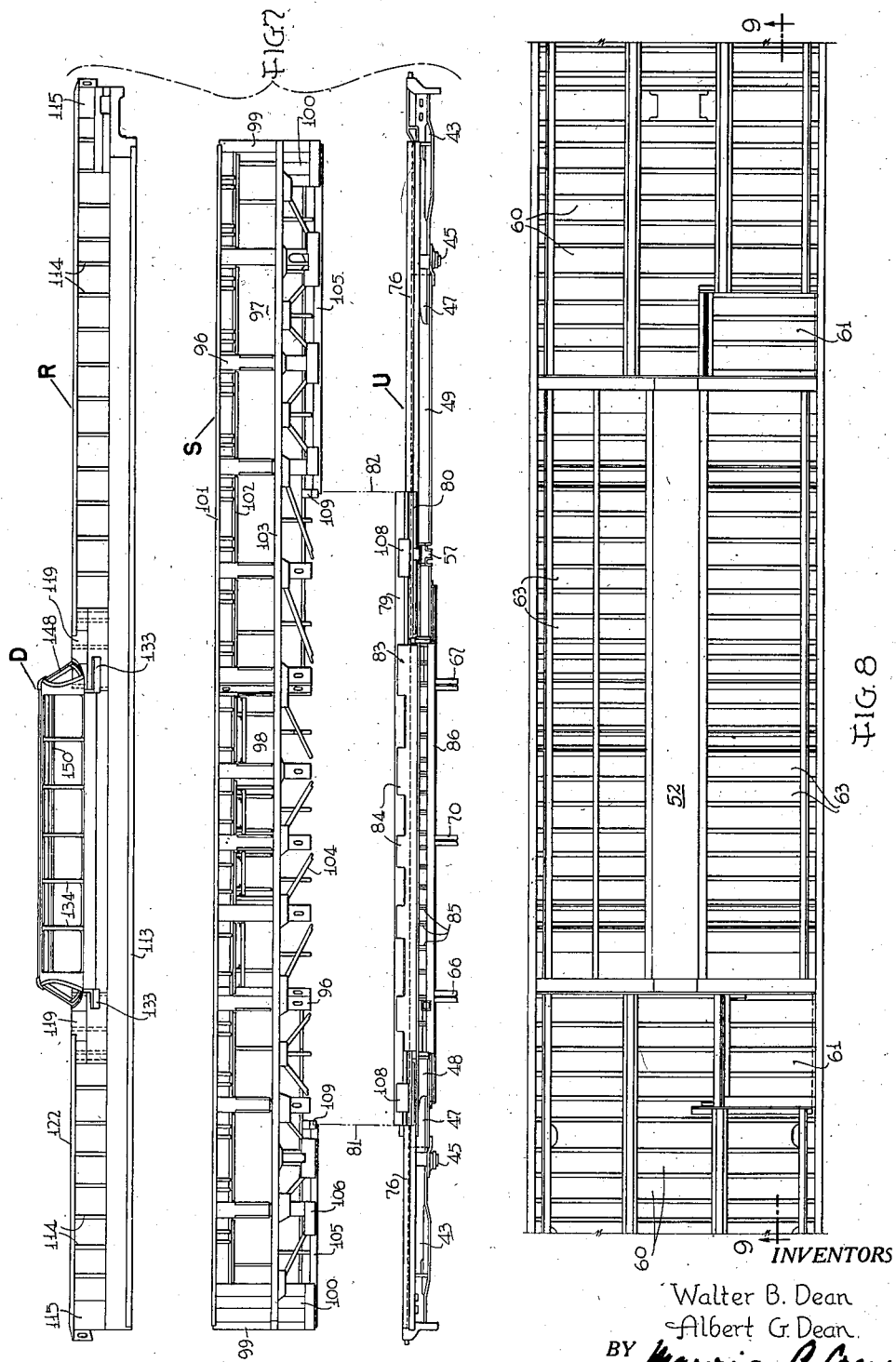
INVENTORS
Walter B. Dean
Albert G. Dean
BY Maurice A. Crews
ATTORNEY

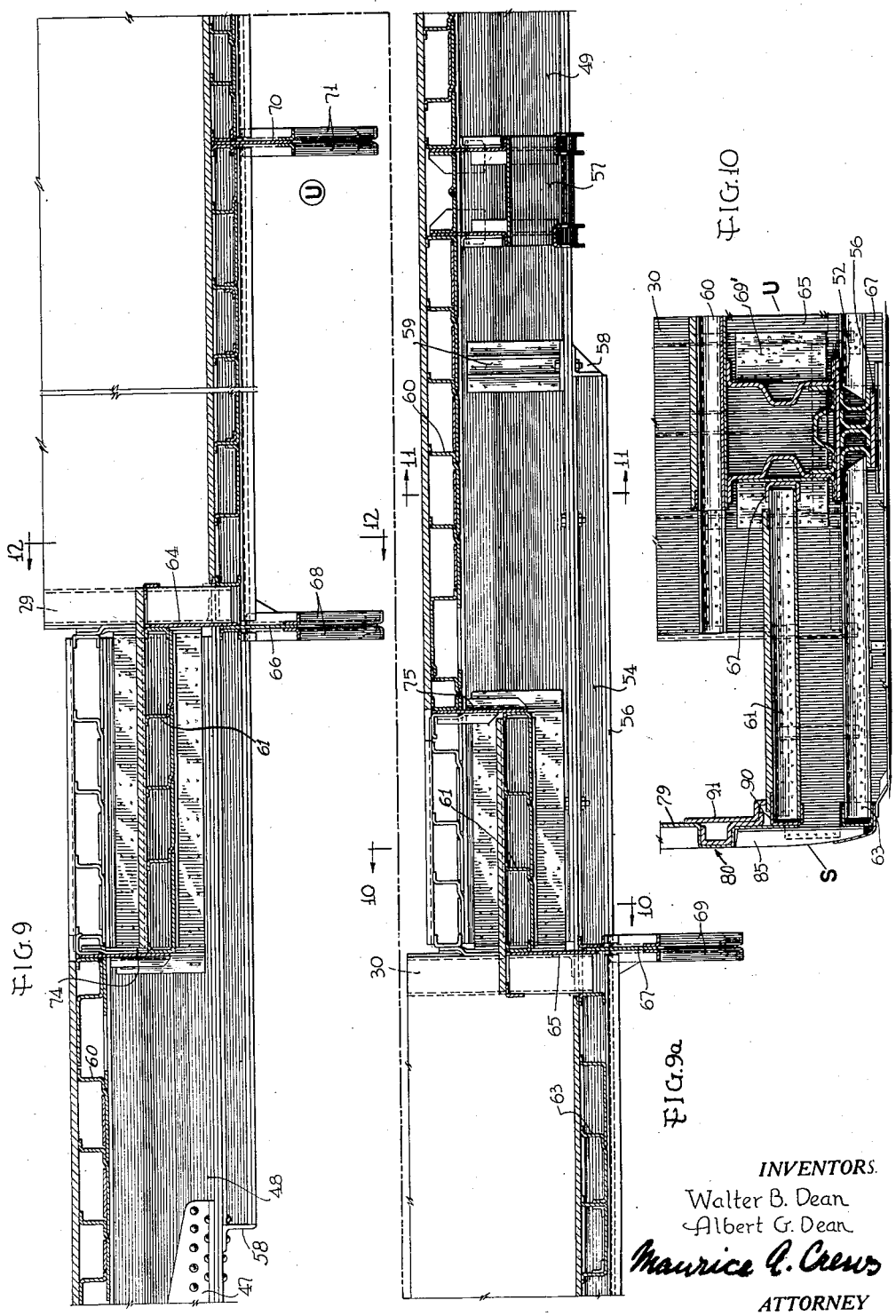

March 18, 1952   W. B. DEAN ET AL   2,589,997
RAILWAY CAR
Filed March 15, 1947   11 Sheets-Sheet 6
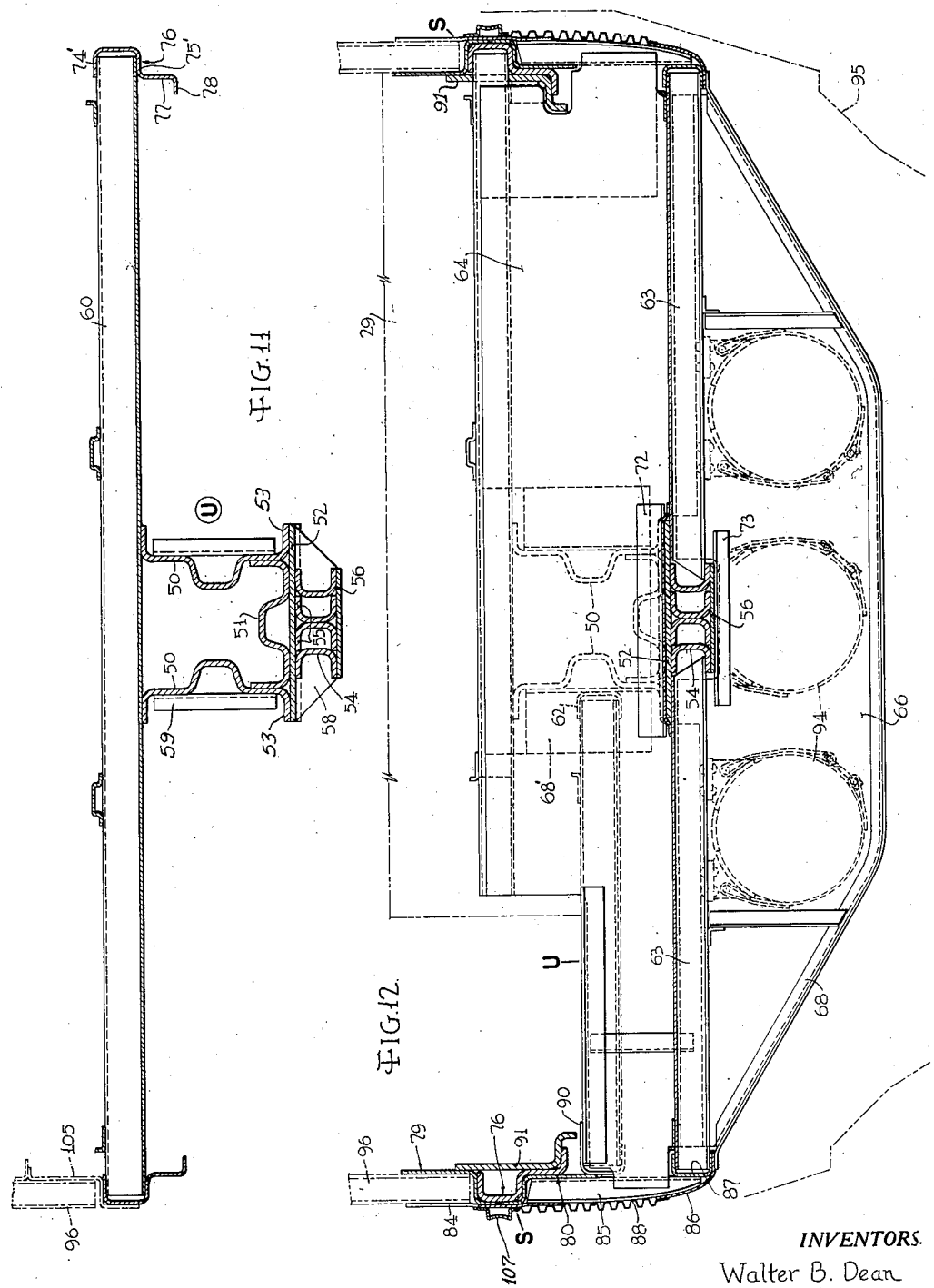
INVENTORS.
Walter B. Dean
Albert G. Dean
BY Maurice Q. Crews
ATTORNEY

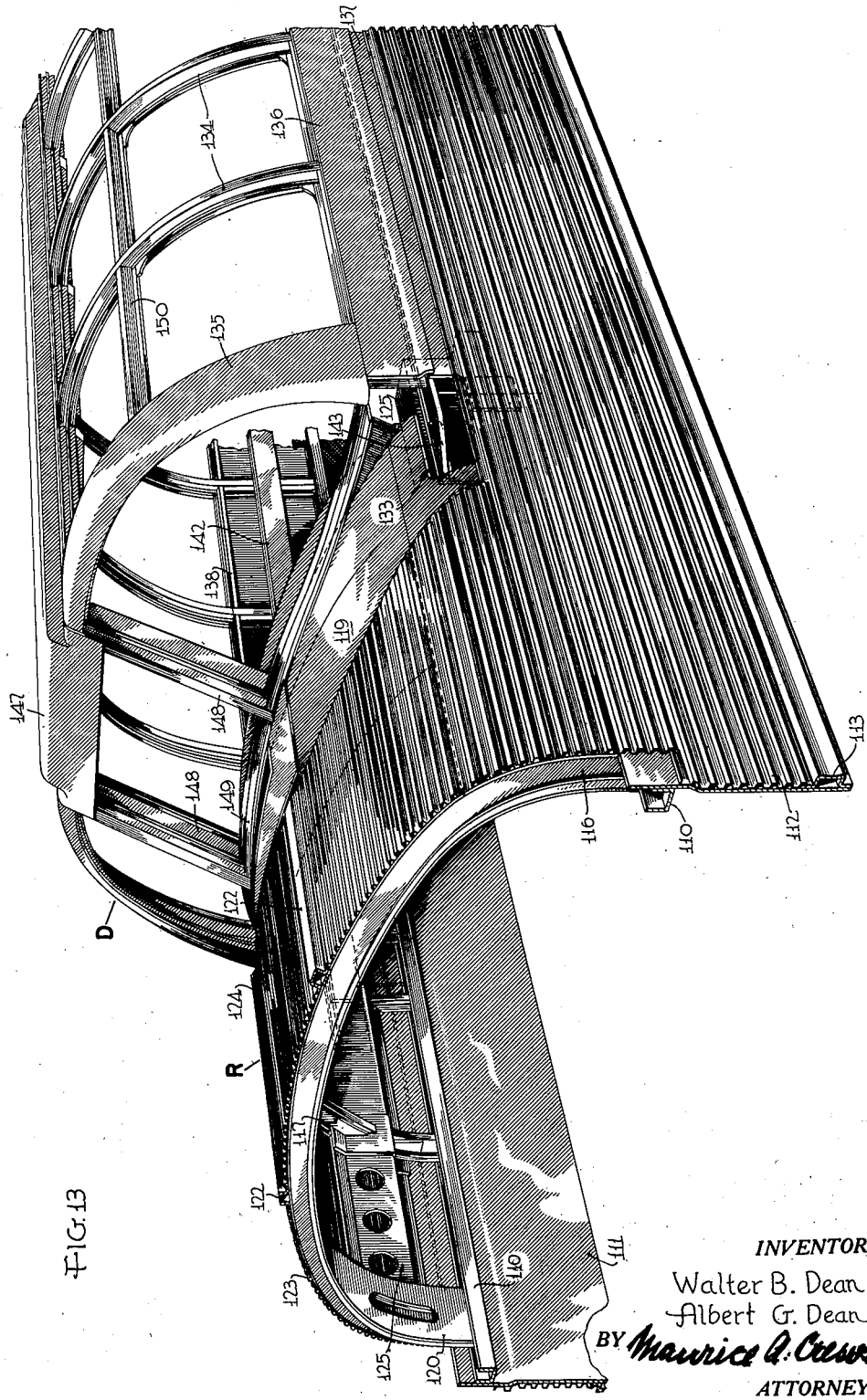

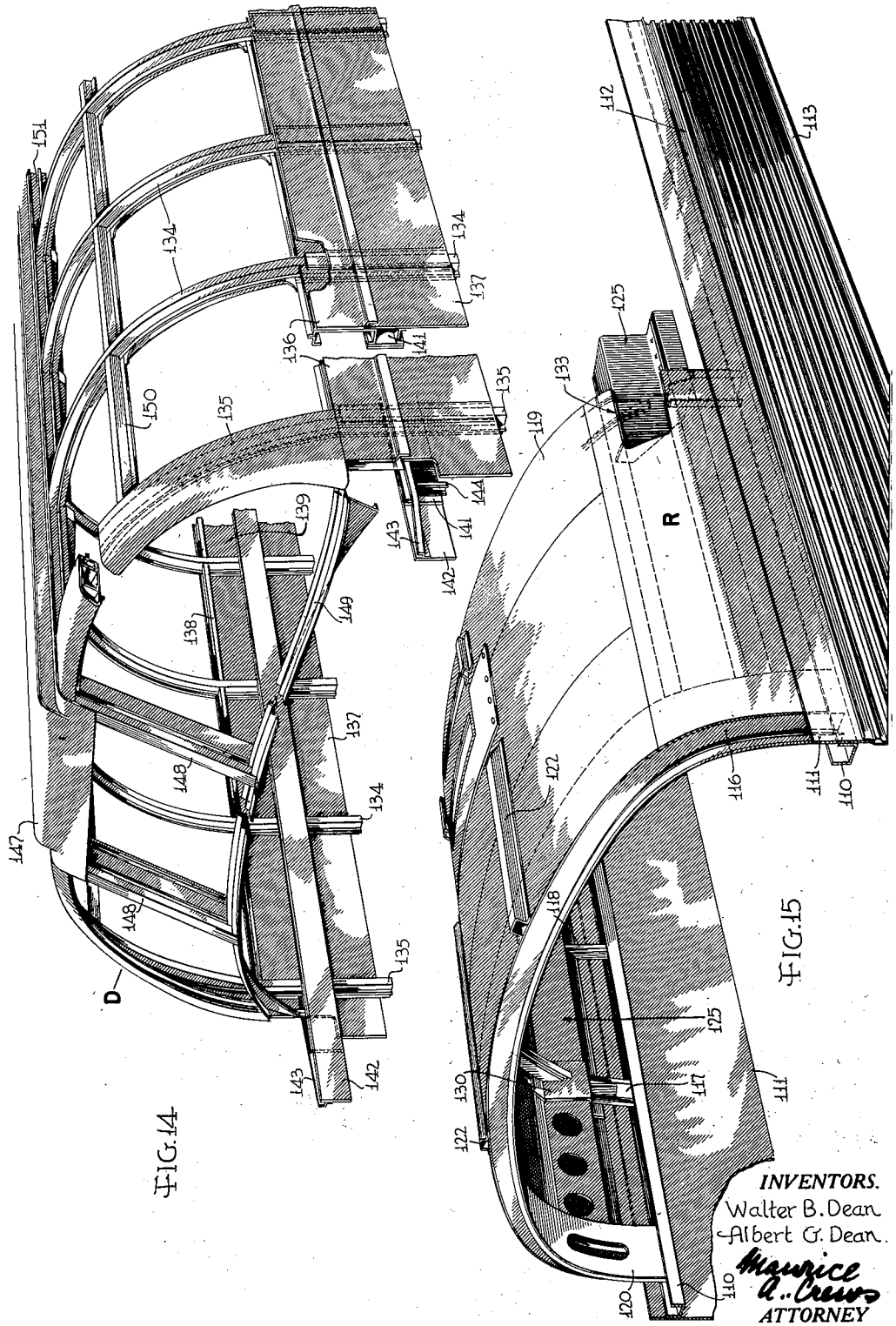

March 18, 1952   W. B. DEAN ET AL   2,589,997
RAILWAY CAR
Filed March 15, 1947   11 Sheets-Sheet 9
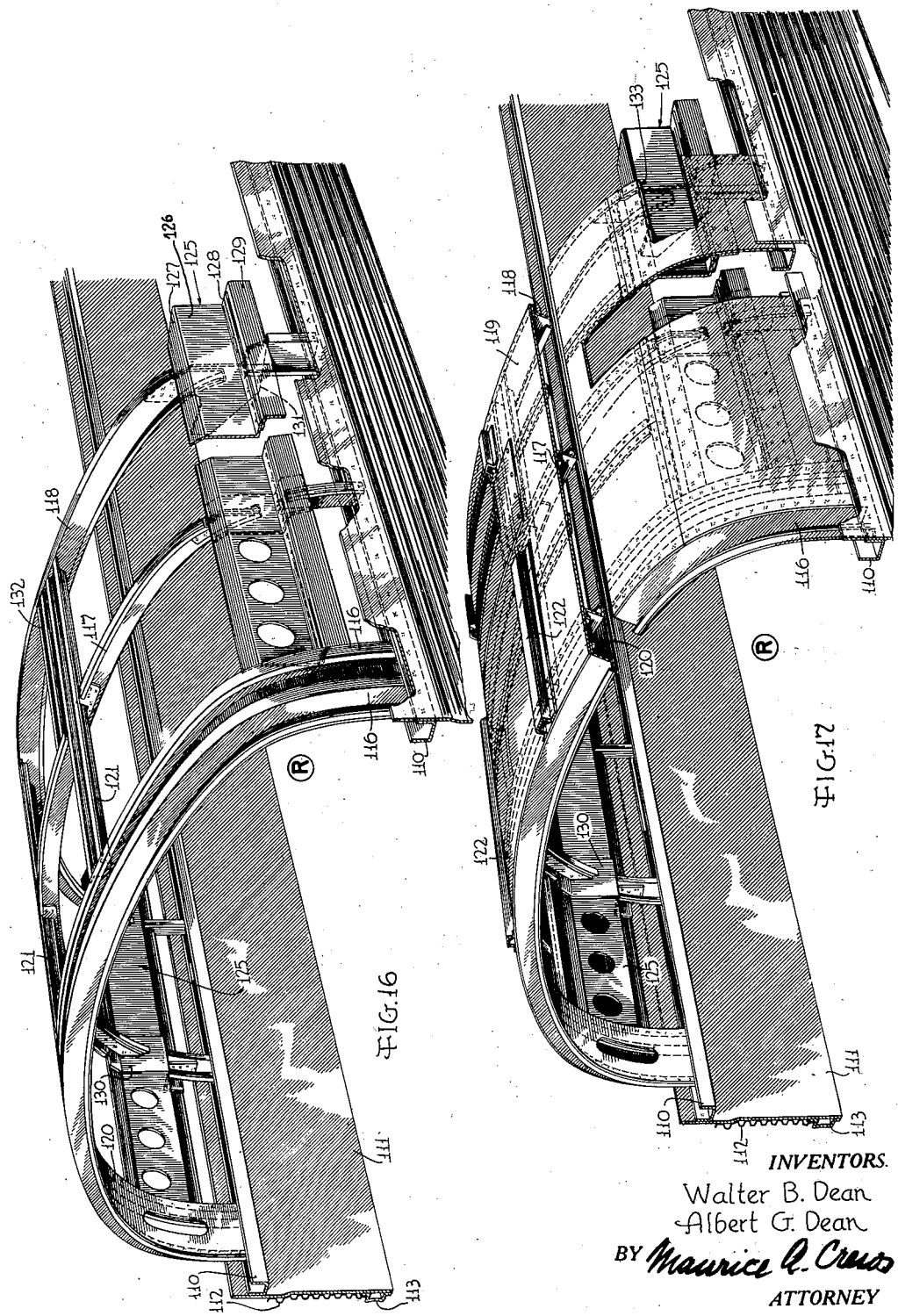
INVENTORS.
Walter B. Dean
Albert G. Dean
BY Maurice A. Cress
ATTORNEY March 18, 1952  W. B. DEAN ET AL  2,589,997
RAILWAY CAR Filed March 15, 1947  11 Sheets-Sheet 10

INVENTORS.
Walter B. Dean
Albert G. Dean
BY Maurice G. Crews
ATTORNEY

March 18, 1952     W. B. DEAN ET AL     2,589,997
RAILWAY CAR

Filed March 15, 1947     11 Sheets-Sheet 11

INVENTORS.
Walter B. Dean
Albert G. Dean
BY *Maurice Q. Crees*
ATTORNEY

Patented Mar. 18, 1952

2,589,997

UNITED STATES PATENT OFFICE 2,589,997

RAILWAY CAR

Walter B. Dean and Albert G. Dean, Narberth, Pa., assignors to The Budd Company, Philadelphia, Pa., a corporation of Pennsylvania Application March 15, 1947, Serial No. 734,955

26 Claims. (Cl. 105—315)

The invention relates to a railway car and, more specifically, to a railway car having part of its floor lowered relative to the adjacent floor portions and/or being provided with two decks or floors. Still more specifically, the invention relates to the type of car called "observation" or "dome" cars in which the roof is provided with a largely transparent dome under which the passengers are carried on an elevated floor.

The broad object of the invention is the general outlay and the construction of a railway car of the indicated type which copes successfully with the many problems presented by the interruption of the floor and/or the roof at the location for the lower floor section or for the dome, respectively.

More specific objects of the invention are a railway car of the indicated type which is light in weight yet strong, the component parts of which are simple and relatively few and can easily be assembled.

Among the more specific objects of the invention is also the construction of a car of the indicated type which permits, to a large extent, the use of the component parts made and employed for the building of standard cars, that is, cars that have an uninterrupted roof and floor construction.

A further specific object of the invention is a construction in which the stresses are efficiently transmitted from one end of the lower floor region and/or the dome region to the other end without undue stress concentration.

Further specific objects of the invention are a construction which is free of obstacles interfering wtih the movement of the passengers, a construction which gives ample headroom on the lower as well as on the upper floor level, a construction which has a great seating capacity and ample accommodations for rest rooms, lounges, etc., and a construction which offers convenient access from the normal level to the lowered and the raised floor levels.

In regard to the dome or observation area, it is a specific object of the invention to offer good visibility without impairing the necessary strength of the structure.

A still further object of the invention is a construction which offers adequate room for accessories such as heating and air conditioning equipment, etc.

The above briefly outlined objects and other objects and advantages are, according to the invention, largely attained by a construction in which the stresses from the floor or roof sections adjoining the lower floor section or the dome section, are transmitted into the side walls by reinforcements of such sections and in which the side walls in the longitudinal regions of the lower floor and the dome are reinforced.

Somewhat more specifically, the invention consists in an underframe having a center sill of great cross sectional area and corresponding strength in the regions of normal floor level in combination with strong transverse members adjacent the lower floor section, and the invention also consists in the distribution of the stresses from the center sill three ways into the region with the lower floor section, one way being through a center sill of reduced height and cross sectional area, and the other two ways being into correspondingly reinforced marginal structures, preferably side sills, forming part of the underframe and/or the side walls.

In the roof, the invention consists in the application of a similar principle, in that the roof regions adjoining the dome area are reinforced and the stresses are transmitted from these reinforced areas into the correspondingly reinforced side walls and partly only through the supporting structure of the dome.

Rather than attempting to give a complete outline of the objects, advantages and features of the invention, it is believed that a more complete picture and an easier understanding will be obtained from the embodiment shown in the attached drawing and described fully hereinafter.

In the drawing,

Figure 1 is a small-scale side elevation of a railway car built in accordance with the invention;

Figure 2 is a diagrammatic longitudinal section through the same car and at the same scale the section being taken in the plane indicated by line 2—2 of Figure 3;

Figure 3 is a fragmentary diagrammatic plan view of the lower floor region and of the adjoining regions of normal floor level, substantially along lines 3—3 of, but on a larger scale than Figure 2;

Figure 5 is a fragmentary section through one-half of the roof and dome unit corresponding in part to the left-hand side of Figure 4 but being on a much larger scale and omitting upholstery, windows, etc., so as to give a clear picture of the basic constructional members;

Figure 6 is a perspective diagrammatic view of the car shown in the preceding figures indicating the general arrangement of the different floor sections, and of the bulkheads at the end of the dome region;

Figure 7 is an exploded view of the roof and dome unit, the side wall units and the underframe unit, which form the main component parts of the railway car, the scale being about the same as that of Figure 1;

Figure 8 is a fragmentary plan view of the underframe unit showing the lowered floor region and the adjoining regions, the extent and scale corresponding closely to those of Figure 3;

Figures 9 and 9a are consecutive partial longitudinal sections along line 9—9 of Figure 8 on a larger scale, the corresponding ends of the two figures being connected by dot-and-dash lines so as to indicate how the figures fit together;

Figure 10 is a fragmentary section along line 10—10 of Figure 9a;

Figure 18:
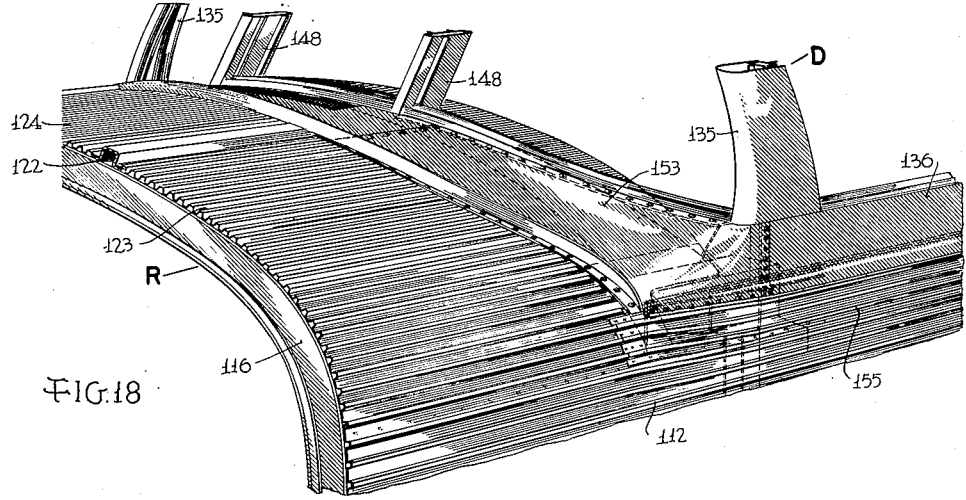
Figure 20:
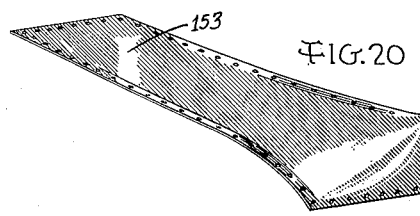
Figure 19:
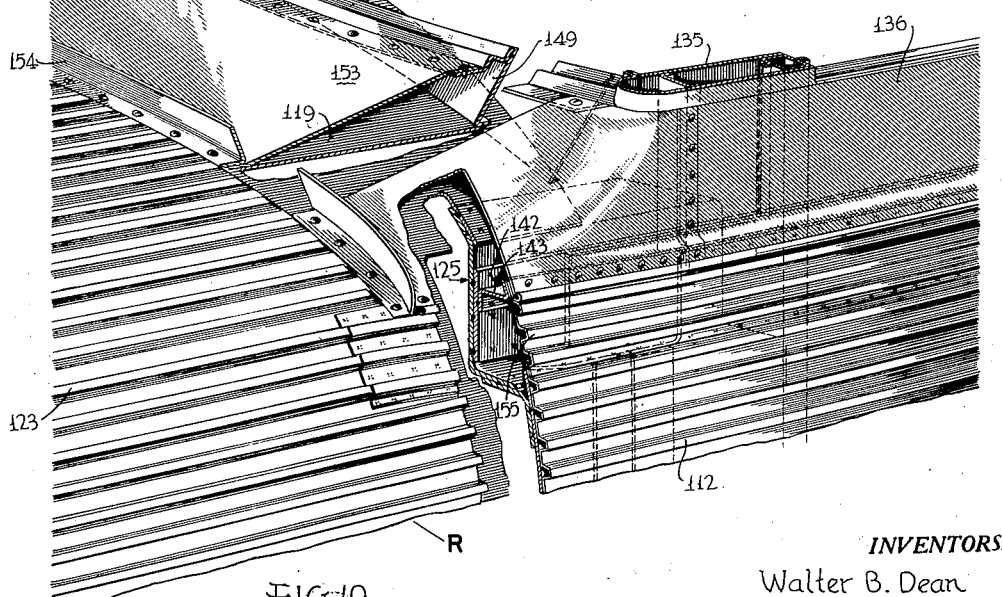

Figures 11 and 12 are transverse sections along lines 11—11 and 12—12 of Figures 9 and 9a, respectively on a larger scale;

Figure 13 is a fragmentary perspective view of the supporting framework of the dome together with a fragmentary perspective and partial sectional view of the adjoining portion of the roof unit;

Figure 14 is a perspective, partially sectional fragmentary view of the dome skeleton together with adjoining reinforcing members for the remainder of the roof;

Figure 15 is a perspective fragmentary view of the roof region adjoining the dome, the outer sheathing being omitted in part so as to expose to view the underlying reinforcements;

Figure 16 is a perspective view corresponding to Figure 15 with the reinforcing-panelling omitted so as to show the supporting framework;

Figure 17 is another view corresponding to Figure 15, certain parts being shown in section so as to illustrate the cooperation of the different members shown in Figures 15 and 16;

Figures 18 and 19 are perspective fragmentary views of one of the ends and corners, respectively, of the dome and the adjoining region of the roof, certain parts being broken away in Figure 19 and shown in section so as to illustrate the relation of the different parts;

Figure 20 is a perspective view of one of the cover or deflecting panels shown in situ in Figures 18 and 19.

Figure 21:
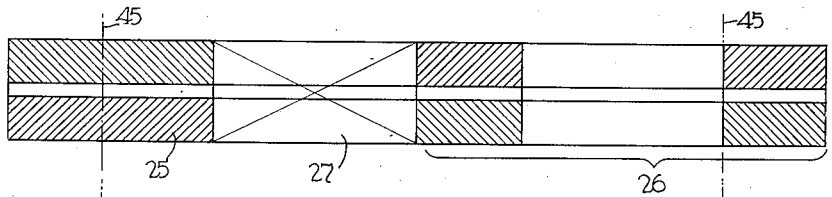
Figure 22:
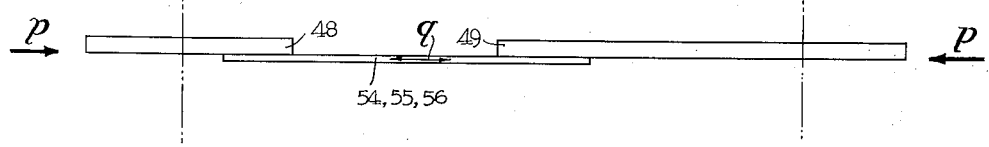
Figure 23:
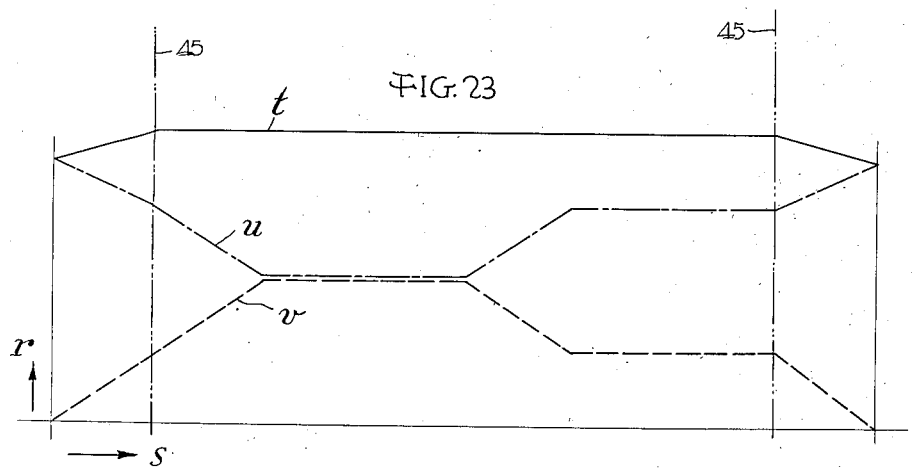
Figure 24:
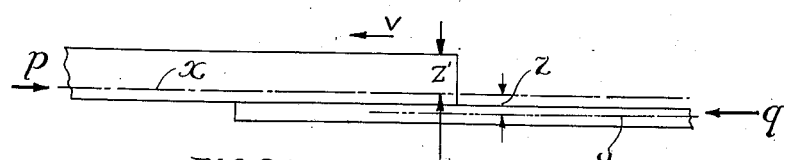

Figure 21 is a diagrammatic small-scale plan view of the underframe unit indicating by shading such areas in which the strength of the floor pans is increased;

Figure 22 is a diagrammatic side elevation of the center sill construction on the scale of Figure 21;

Figure 23 is a stress diagram for the underframe indicating the distribution of the stresses over the length of the underframe in the center sill and in the side sills;

Figure 24 is a fragmentary diagrammatic side elevation on a larger scale of the center sills at the change-over from the normal-level floor to the low-level floor.

*Construction and arrangement in general*

The illustrated railway car is built up of the following main subassembly units: the underframe unit U, a pair of side wall units S, a roof unit R, a dome unit D, the non-vestibule end wall unit NV, and the vestibule end wall unit V.

At the non-vestibule end, the car has a floor section 25 at normal level extending over approximately one-fourth of the car's length. At the other end is a corresponding floor section 26 at normal floor level extending over about one-half of the length of the car. Between these two sections 25 and 26 is a lower floor section 27 over which is arranged the floor 28 for the dome. The floor sections end at and are in part supported by transverse bulkhead walls 29 and 30. The wall 30 is cut out for the entrance opening to the dome, which is accessible by means of the stair 31.

The lower floor section 27 is connected with the end floor sections 25 and 26, respectively, by intermediate steps 32 and 33, respectively. The lower level 27 has at one side an aisle 34 and on the other side rest rooms 35 and 36. 37 is a baggage compartment accessible from the aisle 34. The aisle 34 is shielded by partition walls 38 formed as closet spaces 39 accessible by doors 40. The floor sections 25 and 26 may carry ordinary coach seats 41 while the same or similar type seats 42 are arranged under the dome on the floor 28.

It will be understood that the invention is not restricted to the specific illustrated and described arrangement of seats, rest rooms, etc., but that such an arrangement is only given as an example. The basic construction of the illustrated embodiment lends itself to a great variety of passenger accommodations. The normal-height and/or the lower floor regions may be used for sleeping compartments. The lower floor section may house a lounge, a bar, or other recreational facilities. Yet, these possibilities are likewise merely given by the way of examples and are not intended to be in any way restrictive as to the scope of the invention.

*The underframe*

The construction of the underframe in the region of the normal-level floors 25, 26 is shown to be very similar to the construction illustrated in the application of the co-inventor Walter B. Dean, Serial No. 588,866, filed April 17, 1945 for "Underframe for Vehicles, Especially Railway Cars," now Patent No. 2,504,113, issued April 18, 1950. At each end, as shown in Figures 2 and 7, is an end underframe construction 43 having a transverse bolster 44 and center plate 45 for the support on the trucks 46 of which merely the wheels are diagrammatically shown. The end underframes have arms 47 (Figures 7 and 9) which extend inboard beyond the bolsters 44 and telescope with the outward ends of center sill portions 48 and 49, respectively. The cross section of these center sill portions and their connection with the end underframes is substantially identical with the disclosure of the aforesaid application.

The sill portions 48, 49 (see Figures 4 and 10 to 12) have outwardly facing channel section side walls 50 and an upwardly facing channel section bottom wall 51 fitting between the upstanding webs of the walls 50, and a second substantially flat bottom wall 52 connected to the bottom arms 53 of the side walls 50 and also to the web of the first-named bottom wall 51. Special attention is directed to the flat form of the wall 52, the counterpart of which, in the aforesaid application, has a central bead or channel. This flat form is important in connection with certain features now to be described.

The flat bottom wall 52 extends uninterruptedly over the center sill sections 48 and 49 and across the lower floor region 27. It will be noted that the floor 27 is arranged at about the level of the wall or web 52.

The members 50 and 51 of the center sill sections 48 and 49 end at the bulkheads 29 and 30, respectively. In the region between the aforesaid bulkheads, the center sill is formed by the forizontal web 52, by two pairs of oppositely facing channel sections 54 and 55 and a second flat plate 56. The inner ones, 55, of the sections 54, 55 are secured to each other back-to-back while the upper arms or walls of all four sections are secured to the web 52 and the lower arms to plate 56.

The members 54, 55 and 56 (see Figs. 2, 7, 9 and 9a) extend in both outboard directions a considerable distance beyond the lower floor region and the bulkheads 29 and 30. In the non-vestibule region, they extend to and partly overlap and are secured to the projections 47 of the end underframe. In the other direction, they extend for about the same distance but end on account of the greater length of the center sill secion 49 short of the end underframe and short of a cross bearer 57. This cross bearer 57 may be constructed as disclosed in the aforesaid application and does not require detailed illustration or description. The ends of the sill formed by the members 52, 54, 55 and 56 are closed by transverse angle members 58. The sill portion 49 is reinforced above the member 58 by brackets 59 (Figs. 9a and 11).

From the preceding description of the underframe, it becomes apparent that the center sill has end sections of great height and large cross sectional area, that in the dome region the center sill section has relatively small height, and that all three sections have one continuous wall, the wall 52, in common. This last-named feature, coupled with the long overlap between the different center sill sections, results in relatively great strength of the structure throughout though obviously the center sill portion in the dome region has inherently much less strength than the end portions 48 and 49.

In addition to the transverse reinforcement afforded by the bolster beams 44 and the cross bearer 57, the normal-height floor regions are reinforced by transverse floor pans 60 constituting shear webs. These floor pans are connected with each other and with the top flanges of the center sill side walls 50. In the regions of the steps 33 and 32, the normal-height floor pans are cut away and supplanted by corresponding floor pans 61 firmly secured at their inner ends by means of rails and brackets 62 to the adjacent center sill wall 50. In the section of the floor under the dome region, floor pans 63 have their inner ends telescoped into the space between the top plate 52 and the lower arms of the channel section members 54 (Figure 10). Consequently, the supporting surface of the pans 63 is at about the same level with the plate 52.

At the transitions from the normal-level to the low-level floor regions, panels 64, 65 (Figs. 9 and 9a), respectively, bridges the space between the two levels and is firmly secured to the floor pans 60, 61 and 63. These panels constitute shear webs and are connected with and extended by the webs 66 and 67, respectively, which, together with the webs reinforcing angle-section marginal rails 68, 69, form cross bearers. The webs and members 64, 66, 68 and 65, 67, 69 constitute, after final assembly, downward extensions and integral parts of the bulkheads 29 and 30. Half way between the webs 66, 67 is another similar web 70 with marginal reinforcing angles 71 which is fitted between and secured to adjoining floor pans 63—Figures 2, 7, 9, and 12.

The inboard ends of the center sill sections 48 and 49 are firmly secured by angle-section plates 68' and 69' to the webs 64 and 65, respectively. The continuous sill member 52 and the shallow sill members 54, 55, 56 extend through cut-outs of the webs 64, 66 and 65, 67 as well as of the web 70 and are secured to these webs by transverse angle sections 72, 73—see Figures 10 and 12.

Shear panels 74, 75 constituting step risers connect the floor pans 60 with the floor pans 61 of the steps (Figs. 9 and 9a).

As indicated, the different webs and panels are additionally reinforced by profiles at certain locations, but it is deemed unnecessary to describe in detail these rather obvious subordinate features.

The normal-level floor pans 60 have their ends telescopingly fitted and secured between the walls 74', 75' of the respective channel-section upper portion of the underframe side sills 76 (Figure 12). Each sill 76 has a downward angle-section extension comprising a vertical arm 77 and an inturned flange 78. These sills and their connections with the floor pans 60 are substantially identical with the construction disclosed in the aforesaid application Serial No. 588,866, except for the fact that they are preferably made of heavier material—e. g. about 0.200" thick—as compared with the about 0.125" thick material often used for corresponding ordinary cars.

On either side, the rail 76 is nested into two Z-section rails 79 and 80 which extend through the dome region and therebeyond to lines 81, 82 indicated in Figure 7. Secured to the outside of the outer vertical arms of the rails 79, 80 is a bracket plate 83 having upward extensions 84. These extensions, together with the inner vertical arm of the rails 79, constitute a space for telescopingly receiving the lower ends of the posts and the diagonals of the side wall units as will become apparent later on after the description of the side wall units.

Telescopingly secured between the lower portion of the plate 83 and the downwardly extending arm of the rail 80 are a plurality of longitudinally spaced short profiles 85 which have their lower ends secured between an angle-section rail 86 and a channel-section inwardly facing rail 87. The area between plate 84 and rail 86 is closed on the outside by a corrugated panel 88 secured to said rails and to said members 85 so as to form an additional reinforcement of the underframe in the dome region and to form an uninterrupted extension of the skirts 89 provided, as now customary, in the regions of normal floor level.

The downwardly extending arm of the rail 80 on the aisle side has secured to it an angle-section rail 90 telescopingly fitting over and secured to the step floor pans 61 while the low-level floor pans 63 have their outer ends telescopingly secured in the lower channel-section rails 87.

Figure 4:
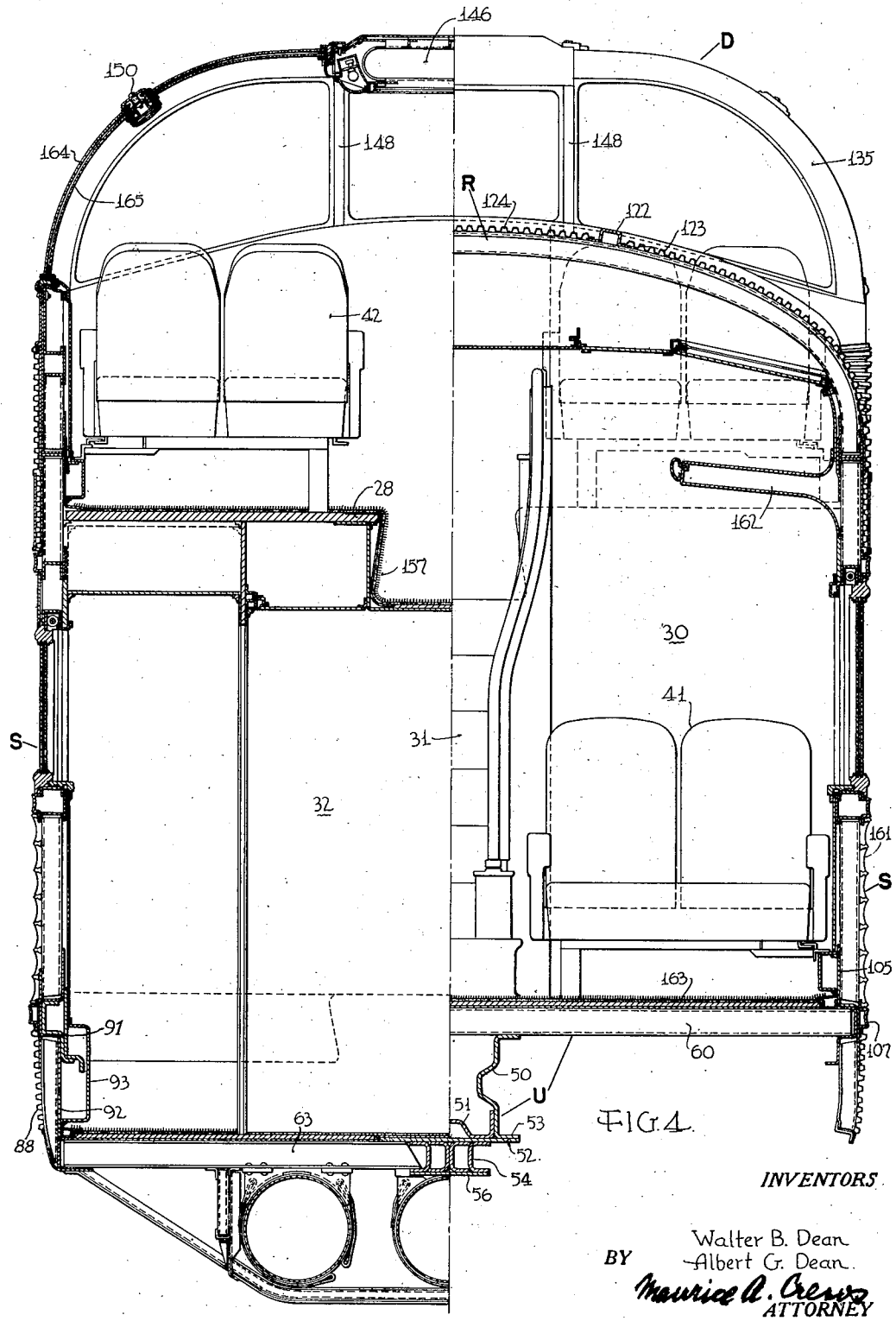
Figure 4 is a transverse cross section through the car, the section being taken substantially along line 4—4 of Figure 3 showing on the left-hand side the construction in the dome region and on the right-hand side a section through the adjoining region with the dome in rear elevation.

Each side sill structure of the underframe unit is further reinforced by an angle-section plate 91 having a vertical outer arm bridging the opening of the channel of rail 76 and being secured to the vertical arm 77 of this rail as well as to the upstanding arm of rail 79 (Figures 10 and 12). This reinforcement 91 extends over about the same length as the rails 79, 80 but its ends are cut out for the insertion of the normal-level floor pan. The space between the rails 80 and 81 may be closed in the low-level floor region by an additional plate 92, and there may be provided a heater or pipe duct 93, etc (Figure 4).

The space under the low-level floor may be employed for the arrangement of water or air tanks 94 or of other equipment. Such tanks or other equipment are arranged between the cross members 66, 67 and 70. It will be noted that all these members are well within the clearance line 95 indicated in Figure 12.

While for the greater part of the length of the floor sections 25 and 26 the floor pans may be of ordinary strength (i. e. about .050" thick), these floor pans are of increased gauge (e. g. about .25" thick) in the end regions in the regions adjoining the bulkheads 29 and 30 as indicated by shading in Figure 21. The purpose of such increase is to use the floor pans together with the bulkheads and their extensions for transferring stresses from the center sill to the side walls and vice versa.

From the foregoing description and the appertaining illustration of the underframe unit, it will have become clear that this unit in and by itself carries buffing and pulling stresses in the end region through the end underframes and the adjoining center sills 48, 49 and that these stresses are only in part taken up by the lowered center sill in the dome region, whereas the balance of the stress is, in the dome region, distributed over the floor pans, the step pans, step risers and transverse webs to the side sills which, in the dome region, are heavily reinforced by side sill members and panelling which are added to the through-running regular side sills 76. In other words, the stresses are split up three ways from the end center sills: one way straight through and two ways laterally to and through the side sills. The stress transmitting capacity of the side portions of the underframe will be further increased by the connection with the side wall units.

The understanding of the stress transfer and distribution in the underframe unit will be facilitated by reference to Figures 21 to 24. While Figure 21 shows by shading the areas in which the transverse members constituted in the embodiment by the floor pans are strongly reinforced so as to transfer longitudinal stresses form the center sill to the side sills and vice versa, and Figure 22 indicates by the arrows $p$ and $q$ the direction of the stresses; Figure 23 shows the relative magnitude of the stresses $r$ over the length $s$ of the underframe. The location of the center plate axes is indicated by the lines 45.

In Figure 23, the curve $t$ represents the total stress, the curve $u$ the stress transferred by the center sill, and the curve $v$ the stress transferred by the side walls.

Figures 22 and 24 show that the longitudinal forces represented by the arrows $p$ and $q$ create a momentum or moment but that this momentum is, in the first place, relatively small due to the fact that the particular type of center sill as illustrated for instance in Figure 11, has its neutral plane $x$ far below its geometric center and relatively close to the bottom wall, and that also the neutral plane $y$ of the center sill portion in the lower floor region is, on account of the relatively shallow construction, rather close to the bottom wall of the main center sill. Consequently, the distance $z$ between the planes $x$ and $y$ is relatively small.

Actually there will scarcely be any momentum to be taken care of by the connection between the normal-level center sills and the low-lever center sill on account of the hereinbefore described arrangement of the normal-level floor panels and transmission of stresses through these floor panels from the normal-level center sill members into the side walls in the dome region and vice versa. As illustrated especially in Figures 21, 23, and 24, the reinforced floor pans adjacent the dome region transmit a large portion of the stresses from the center sills 48, 49 into the side walls, see curve $v$ in Figure 23. This transfer of stresses by the floor pans takes place at about the top of the center sill sections 48, 49 at a distance $z'$ from the neutral plane $x$ of said center sill sections. Obviously, the stresses $v$ transmitted by the floor pans to the side walls, times their distance $z'$ from the neutral plane $x$ counteracts the stresses $q$ transmitted by the low-level center sill member times its distance $z$ from the neutral plane $x$. The structure will be so proportioned that the aforesaid two products of stresses and distances from the neutral plane $x$ are exactly or almost equal.

Finally, any residual momentum is safely taken care of by the long overlap between the different center sill sections, as more fully illustrated in Figures 9 and 9a.

*The side wall units*

The side wall units S differ but slightly from the side wall units of standard car construction. They may be substantially identical with the side wall units disclosed in the co-inventor Walter B. Dean's application Serial No. 585,899, filed March 31, 1945 for "Body Side Wall for Vehicles, Especially Railway Cars" now Patent No. 2,504,659, issued April 18, 1950.

In brief, the side wall units comprise longitudinally spaced posts 96 arranged between successive window openings 97, 98 and end posts 99, shear panels 100, top chords 101, above-window chords 102, a chord 103 along the lower margin of the window openings, diagonals 104 and other reinforcements. The region corresponding to the region between the lines 81 and 82 of the underframe unit is free of a bottom sill but the end regions have a bottom sill 105 of Z-section nesting with its web and outer downwardly directed arm over the rail 76 of the underframe unit in final assembly. In the end regions, the posts 99, diagonals 104, etc., are telescopingly secured between the upwardly directed arm of the rail 105 and outer gusset plates 106 and a rub rail 107.

Upon final assembly, the lower ends of the posts and diagonals between the lines 81, 82 which are free of the bottom sill 105 are telescopingly fitted between and secured to the upstanding portion of the underframe rail 79 and the extensions 84 of plate 83. However, the last posts in this region are free of rail 105 and plate 83 and are held by gussets 108 secured in the same manner to the underframe unit as the plate 83. At the meeting point of the rails 79 and 105, splicing plates 109 are provided (Figure 7).

It will be noted that while the lower center sill portion ends inboard of the cross bearer 57, the side sill reinforcements of the underframe unit extend in outboard direction beyond the cross bearer. This helps in the transmission of the stresses without undue stress concentrations.

The roof unit

The roof unit R has through-running upwardly facing channel-section side sills 110 to which are secured on each side to a downwardly projecting through-running shear panel 111. The outside of each panel 111 is covered and reinforced by longitudinally corrugated sheet metal 112 and a lower hat section 113. In the regions remote from the dome, the rails 110 are interconnected by regular transverse carlines 114 and at the end additionally by transversely extending shear panels 115.

The dome region proper is free of the carlines, but in both directions adjacent the dome region the side sills 110 are interconnected by one pair of closely spaced carlines 116 and two further carlines 117, 118 (Figure 16). The carlines 118 define the opening for the insertion of the dome unit D. The carlines 116, 117, 118 are connected on their outside with a shear panel 119, and the carlines 116 are connected on the inside with a web 120 so as to obtain a closed box-section. In addition, the carlines are interconnected by a pair of longitudinally extending upwardly facing hat sections 121 secured with their flanges to the shear panel 119 and arranged underneath purlines 122 which overlap the outboard region of the shear panel 119, are connected with all carlines 114 and the shear panels 115, and have their ends, in final assembly, connected to the collision posts of the end walls NV and V. The spaces between the corrugated panels 112 and the purlines 122 and the space between the two purlines 122 are covered by longitudinally corrugated sheet metal strips 123, 124 which extend from the ends of the roof unit close to the opening for the dome.

The carlines 116, 117, 118 are, furthermore, interconnected in a region slightly above the side sills 110 by angle sections 125 having a vertical arm 126 with an inwardly and upwardly directed flange 127 and a lower outwardly directed arm 128 with a downwardly directed flange 129. These rails have their ends connected to the inboard carlines 116 and cut into the carlines 117, 118 which latter have their interrupted ends connected and reinforced not only by the rails 125 but also by gusset plates 130 and 131. The rails 125 are secured by their flanges 127, 129 to the shear panel 119. This shear panel may consist of several plates connected with each other by their meeting margins into one integral structure. The carlines 117 and 118 are still further interconnected by short rails 132 arranged inwardly of the rails 121. Cut-outs 133 in the plates 119 in the regions of the inboard ends of the rails 125 serve to give access to the interior for effecting the connection between roof unit and dome unit, as will become apparent later on.

It will be easily understood that the roof unit so far described is quite similar to an ordinary roof unit such as disclosed in the co-inventor Walter B. Dean's application Serial No. 585,900, filed March 31, 1945 for "Body, Especially Roof for Vehicles Such as Railway Cars," now Patent No. 2,504,111, issued April 18, 1950, and that it may be connected with the side wall units as likewise disclosed in said application, that is, by connecting the roof side sills 110 with the upper side wall chords 101 and by connecting the downwardly projecting members 111, 112, 113 with the side wall chords 101, 102, the upper ends of the side wall posts 98, 99, and with the outboard door posts formed on the end wall V. Actually, the dome unit D will be preassembled and then united with the roof unit R prior to the assembly of the roof unit with the side wall units S.

The dome unit

The dome unit D (Figures 5, 13 and 14) has a plurality of longitudinally spaced intermediate carlines 134 and end carlines or frames 135. The downwardly extending ends of these carlines are interconnected on the outside by shear panels or plates 136, 137. Note that the carlines have their lower ends projecting beyond the lower margin of the plates 137. In the same region, the carlines are interconnected by hollow section members 138, 139, 140 extending between successive carlines. The inner adjacent margins of the sections 139, 140 and the insides of the carlines themselves are connected with through-running plates 141, 142. The plate 141 extends a certain distance beyond the carlines 135 in outboard direction and the inner plate 142 extends a somewhat greater distance in the same direction, as clearly visible in Figure 14. The projecting ends of the plates are further reinforced by a member 143 arranged in extension of the lower part of member 139. Still further, the extensions are reinforced by a vertical member 144.

The central portions of the carlines 134 are bifurcated at 145 so as to afford an open space 146 for the passage of heating and air conditioning conduits (Figures 4 and 5). In this bifurcated region, the carlines are interconnected on the outside by a shear panel 147 which extends in longitudinal direction a short distance downwardly beyond the carlines 135 and is continued by downwardly inclined members 148 which, upon final assembly, are arranged in about the same vertical longitudinal planes as the purlines 122 of the roof unit (Figures 13 and 14). The lower ends of the members 148 are interconnected by a transverse member 149 and the carlines 134, 135 are interconnected between the members 138, 139 and the bifurcations 145 by longitudinal rails or mullions 150. Further longitudinal members 151 interconnect the carlines along the margins of the panel 147 which is centrally reinforced by Z sections 152. The members 134, 135, 148 and 150 are closed box sections composed of sheet metal so as to combine relatively great strength with light weight.

After the dome unit has been preassembled as shown in Figure 14, it is lowered into the opening in the roof unit so that the extending members 141 to 144 pass through the openings 133 of the roof panels 119, so that the extending members 142 overlap the upstanding arm 126 of the roof rails 125, so that the projecting ends of the carlines 134, 135 telescopingly fit into the roof rails 110, and so that the plate 137 with its lower margin overlaps the inside of the upper marginal portion of the roof shear panel 111. The overlapping portions are then securely interconnected, such as by welding and riveting. Likewise, the dome cross members 149 are secured to the inward margins of the roof panels 119, and finally the spaces between the inboard margins of the corrugated panels 123, 124 and the rails 149 are covered by cowl panels 153 simultaneously with the attachment of a deflector strip 154.

Finally, the spaces between the sides of the cowl panels 153 and the lower margins of the dome panels 136 and the upper margins of the corrugated lateral roof panels 112 are covered on each side by a corrugated strip 155 which also covers the openings 133 permitting the connection between the extensions 142 of the dome unit with the rails 125 of the roof unit.

*The complete assembly*

As indicated briefly in the course of the description of the several individual units U, S, R and D, the roof unit R will be preassembled with the dome unit D and hereupon final connection will be made of the side wall units with the underframe unit and the roof unit.

During or after this final assembly, the bulkhead walls 29 and 30 will be installed. These bulkhead walls, though not shown in detail, are preferably skeleton structures covered on the one side by and integrally connected with a shear panel. These bulkheads are firmly tied into the side walls, the underframe and the roof at the ends of the dome. It was described hereinbefore how the bulkheads are continued into the underframe by the webs 64 and 65, respectively, and, furthermore, by the cross bearers 66 and 67.

The bulkheads 29 and 30 are, furthermore, interconnected by the supporting structure for the dome floor 28, which structure includes the channel-section lowered aisle 157 (Figures 4 and 6).

As diagrammatically illustrated in Figure 6, the car may be considered as consisting of three sections, the non-vestibule end section 158, the vestibule end section 159, and the dome section 160. These sections, which have their floors at different levels, may be considered as three boxes having the adjoining bulkhead walls 29 and 30 in common. In this arrangement, the bulkheads help considerably in collaboration with the described construction of underframe, side walls and roof in the transmission of the stresses.

The drawings show also exterior and interior equipment such as removable outer panels 161, baggage racks 162, floor boards 163, etc. (Figure 4), all of which are believed not to require detailed description because they may be of standard construction or are even disclosed in detail in the applications of the co-inventor Walter B. Dean, referred to hereinbefore.

The openings surrounded by the described members 134, 135, 136, 138, 150, 151 are glassed-in preferably by outer curved panes 164 and inner safety-glass panes 165 (Figure 4).

It requires scarcely mentioning that the different members entering into the construction consist mostly of sheet metal profiles, preferably of high tensile stainless steel, and are integrally connected with each other preferably by electric spot welding, unless other connecting methods are indicated in the drawing.

While, for the sake of convenience and briefness, in the foregoing description sometimes the construction on one side or on one end only has been described and/or shown, and though sometimes it may not have been mentioned specifically that the same construction appears also on the other side or on the other end, it will be obvious to the reader where such conditions exist, so that no lengthy repetitious explanations are necessary.

It will also be understood that the invention is not restricted to the illustrated embodiment but that is basic principles are applicable to other constructions and that modifications, without departing from the spirit of the invention, will occur to those skilled in the art.

Protection is sought for the invention as broadly as expressed by the spirit and the language of the attached claims.

What is claimed is:

1. In a railway car: an underframe, side walls and a roof; wheel-supported car end portions having the underframe at a first level; a car middle portion provided with a dome projecting above the roof of said end portions and having the underframe at a second level below said first level; said underframe, side walls and roof constituting main stress-transmitting and load-supporting elements of the car; a pair of vertically and transversely arranged bulkheads located respectively at the transition from the end portions to the middle portion and structurally connected to roof, side walls and underframe; said bulkheads being formed as structural elements transferring stresses from the underframe at the first level to the underframe at the lower second level, from the underframe into the side walls, and from the roof into the side walls.

2. In a railway car: an underframe and side walls; a first car portion having the underframe at a first level; an adjoining car portion having the underframe at a second level below the aforesaid first level; said underframe and side walls constituting main stress-transmitting and load-supporting elements of the car; a vertically and transversely arranged bulkhead located at the transition of said portions and stress-transmittingly connected to said side walls and underframe; said bulkhead being a main structural element of the car assisting in the transfer of stresses from the underframe at one level to the underframe at the other level and from the underframe into the side walls.

3. In a railway car: side walls and a roof constituting main stress elements; an interruption of the roof for a dome; transversely and vertically arranged bulkhead structures located at the ends of said roof interruption and stress-transmittingly connected with roof and side walls; said bulkhead structures being main structural elements of the car and being shaped and constructed for transferring stresses from the roof adjacent the interruption into the side walls.

4. In a railway car having a roof provided over a longitudinal region located between its ends with an observation dome under which passengers may be accommodated on an elevated floor, said railway car being composed of the following longitudinally extending main subassembly units: an underframe unit, side wall units, a roof unit, the latter extending over the entire length of the car and provided with an opening at the location of the dome, and a dome unit.

5. In a railway car: normal-level floor areas at and adjacent the wheel-supported ends and a low-level floor area between said normal-level floor areas, an underframe, an underframe center sill of relatively great height and cross sectional area in each of the normal-level floor areas adjoining the low-level floor area, a shallow underframe center sill of less height in the low-level floor area which projects in both directions beyond the low-level area and is overlappingly secured to the underside of the center sills in the normal-level floor areas, through-running side sills extending continuously along the normal-level and the low-level floor areas, additional side sill members extending along the low-level floor area and therebeyond and being overlappingly secured to the through-running side sill members, transverse stress-transmitting members interconnecting the center sills in the normal-level floor areas with said side sills and their additional side sill members in regions adjacent the low-level floor area for transmitting stresses from the center sills in the normal-level floor areas partly into the center sill of the low-level floor area and partly into the side sills.

6. In a railway car according to claim 5, having said transverse members constituted at least in part by horizontal shear panels reinforced by longitudinally spaced vertical transverse webs.

7. In a railway car according to claim 5, having the normal-level floor areas provided with a horizontal shear panel interconnecting the side sills and the center sill and being integrally connected with vertically arranged longitudinally spaced transverse webs, said shear panel and its webs being of heavier gauge in the regions adjacent the low-level floor area so as to constitute the said transverse members transmitting stresses from the center sills in the normal-level floor area to the side sills.

8. In a railway car according to claim 5, having said transverse members constituted in part by a step adjacent the ends of the low-level floor area, which steps are inserted between the ends of the center sills of the normal-level floor area and the side sills.

9. Center sill construction for a railway car having normal-level floor areas at both ends and a low-level floor area between such ends, said center sill construction having for each normal-level floor area a portion of great height the neutral plane of which is located below its geometric center and a center sill portion for the low-level floor area of greatly reduced height, this arrangement resulting in a relatively close spacing between the neutral planes of the adjoining center sill portions thereby keeping small the momentum due to longitudinal stresses and said spacing.

10. Center sill construction for a railway car having a normal-level floor area and an adjoining low-level floor area, the center sill for the normal-level floor area consisting of an upwardly facing channel having great height and its neutral plane arranged considerably below its geometric center. the center sill for the low-level floor area being a shallow closed box section overlappingly secured by extensions to the bottom wall of the center sill in the normal-level area, this arrangement resulting in a close spacing between the neutral planes of the adjoining center sills so that the momentum created by longitudinal stresses is kept small.

11. Center sill construction for railway cars having adjoining sections at different floor levels, the center sills for the adjoining sections having one horizontal through-running wall in common to which are secured vertical center sill members, the vertical sill members in the higher-floor-level area being secured to the top and the vertical center sill members in the lower-floor-level area being secured to the underside of the through-running horizontal wall.

12. In a construction according to claim 11, having the vertical members secured to the underside of the through-running wall extended for a certain distance into the higher-floor-level area so as to afford an overlap-joint for withstanding the momentum incident to the spacing between the neutral planes of the adjoining center sills.

13. In a railway car having a floor in a first longitudinal region at a first level and a floor in a second adjoining region at a second lower level, side sills extending along both regions at said first level, sill reinforcements extending in and adjacent said second region downwardly beyond and being structurally connected with said side sills, said downwardly extending reinforcements forming supporting means for the floor in said second region.

14. In a railway car according to claim 13, said downwardly extending reinforcements presenting skirts arranged in continuation of skirts which are at least in part removably connected with the car in the first region.

15. In a railway car according to claim 13, said downwardly extending reinforcements comprising a second sill structure arranged at a distance below said side sill on each side of the car, longitudinally spaced vertical members interconnecting each side sill with its second sill structure and a shear panel extending across and structurally connected with each said sill, second sill structure and vertical members.

16. In a railway car having wheel-supported end regions with a floor at a first level and a middle region with a floor at a second level, said railway car comprising a preassembled underframe unit and preassembled side wall units, said underframe unit having means for transmitting a large portion of the stresses from center sills in said end regions into through-running underframe side sills, said side sills being strongly reinforced in and adjacent the middle region, said side sills forming part of final assembly means between the underframe unit and the side wall units, said side wall units comprising posts interconnected by longitudinal chord members, including bottom sills which interconnect the lower ends of certain said posts and constitute parts of the final assembly means between the side wall units and the underframe unit, said bottom sills being restricted to the end regions while the side wall units are free of such bottom sills in the regions of the reinforcements of the side sills of the underframe unit so that in the last-named region the freely projecting lower ends of the posts are to be individually connected to the underframe unit whereas in the end areas the units are connected by the joinder of the side and bottom sills.

17. In a railway car: side walls, a roof, an observation dome in the roof and projecting upwardly therebeyond, a transverse vertical wall structure at each end of the dome and connected with roof and side walls, a floor for supporting passengers in the dome, said floor being arranged lower than the roof and supported at least partly by said transverse wall structures.

18. In a railway car, a roof having longitudinally spaced carlines tied into side wall structures, a space between two successive carlines for the insertion of a dome unit, lateral longitudinal reinforcements connecting a plurality of carlines adjacent said space, a dome unit having transverse longitudinally spaced carlines interconnected by lateral longitudinal reinforcing means, said last-named means having extensions projecting longitudinally beyond the dome carlines for overlapping engagement with and securement to said reinforcements of the roof carlines.

19. In a railway car, a roof having longitudinally spaced carlines, a larger space between two successive carlines for the insertion of a dome unit, lateral longitudinal reinforcements connecting a plurality of carlines adjacent said space, shear panels overlapping and secured to a plurality of carlines adjacent said space and to said reinforcements, a dome unit having transverse longitudinally spaced carlines interconnected by lateral longitudinal reinforcing means, said last-named means having extensions projecting beyond the end of the dome carlines for overlapping engagement with and securement to said reinforcements of the roof carlines, said shear panels having openings permitting the passage of said extensions.

20. In a railway car having a roof provided with an observation dome projecting upwardly above an adjoining roof portion, said roof constituting a main stress-transmitting element and being provided longitudinally adjoining said dome with a transversely extending first shear panel, second shear panels arranged along the lower longitudinal sides of the dome, said first and second shear panels being stress-transmittingly connected for transferring stresses from the roof into the second shear panels and thereby past the dome.

21. In a railway car having a roof provided with an observation dome projecting upwardly above an adjoining roof portion, said roof constituting a main stress-transmitting element and being provided longitudinally adjoining said dome with a transversely extending first shear panel and with longitudinally continuous lateral second shear panels, third shear panels arranged along the lower longitudinal sides of the dome above and contiguous with said second shear panels, said shear panels being stress-transmittingly connected for transferring stresses by the first shear panel from the roof into the second and third shear panels and thereby past the dome, said third shear panels constituting reinforcements in the region weakened by the dome.

22. In a roof for a railway car, longitudinally spaced roof carlines having their ends interconnected by longitudinal lateral structures, a dome in said roof extending upwardly therebeyond, longitudinally spaced dome carlines connected to said structures in a region adjoining the region of said roof carlines, purlines arranged close to and on both sides of the middle line of the roof and connected with said roof carlines, longitudinal reinforcements of the dome extending across the ends and the top of the dome in extension of said purlines, and means for structurally interconnecting said purlines and said reinforcements.

23. In a roof for a railway car, longitudinally spaced roof carlines having their ends interconnected by longitudinal lateral structures, a dome in said roof extending upwardly therebeyond, longitudinally spaced dome carlines connected to said structures in a region adjoining the region of said roof carlines, purlines arranged close to and on both sides of the middle line of the roof and connected with said roof carlines, longitudinal reinforcements of the dome extending across the ends and the top of the dome in extension of said purlines, shear panels structurally interconnecting said purlines with said reinforcements and a plurality of roof carlines adjacent the dome.

24. An observation dome unit for insertion into an opening of and connection with a roof of a railway car, said unit comprising longitudinally spaced transverse carlines, central and lateral longitudinal rail structures interconnecting the carlines, and transverse rail structures at the ends of the dome, said lateral and transverse rail structures and the lower ends of the carlines being formed as means for the final assembly of the dome with mating means on the roof.

25. In a railway car: a high-level floor area and an adjoining low-level floor area, an underframe, a first underframe center sill of relatively great height and cross sectional area in the high-level floor area, a second underframe center sill of less height in the low-level floor area overlappingly secured to said first center sill, said first center sill having its neutral plane at a higher level than the neutral plane of said second center sill, side sills extending uninterruptedly along adjoining regions of said two floor areas, transverse members connected with said first center sill above the neutral plane thereof and with said side sills, the construction affording that longitudinal stresses from said first center sill are transmitted partly into the side sills by said transverse members at a level above the first center sill's neutral plane and partly into the second center sill below the first center sill's neutral plane.

26. In a railway car: a high-level floor area and an adjoining low-level floor area, an underframe center sill in the high-level floor area, an underframe structure in the low-level floor area overlappingly secured to said first center sill in the region adjoining the low-level floor area, said center sill having its neutral plane at a higher level than the neutral plane of said underframe structure, frame structures along the lower lateral margins of the car extending uninterruptedly along adjoining regions of said two floor areas, transverse members connected with said center sill above the neutral plane thereof and with said last marginal frame structures, the construction affording that longitudinal stresses from said center sill are transmitted partly into the marginal frame structures by said transverse members at a level above the center sill's neutral plane and partly into the underframe structure below the first center sill's neutral plane.

WALTER B. DEAN.
ALBERT G. DEAN.

REFERENCES CITED

The following references are of record in the file of this patent:

UNITED STATES PATENTS

| Number | Name | Date |
|---|---|---|
| 2,322,941 | Kock et al. | June 29, 1943 |
| 2,366,709 | Dean | Jan. 9, 1945 |
| 2,405,136 | Dittrich | Aug. 6, 1946 |